US008503803B2

(12) United States Patent
Song et al.

(10) Patent No.: US 8,503,803 B2
(45) Date of Patent: Aug. 6, 2013

(54) METHOD AND APPARATUS FOR ENCODING/DECODING IMAGE BY PARTITIONING IMAGE

(75) Inventors: Hak-sup Song, Suwon-si (KR); Woo-sung Shim, Yongin-si (KR); Young-ho Moon, Suwon-si (KR); Jong-bum Choi, Yangju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1112 days.

(21) Appl. No.: 12/048,650

(22) Filed: Mar. 14, 2008

(65) Prior Publication Data

US 2008/0317361 A1 Dec. 25, 2008

(30) Foreign Application Priority Data

Jun. 19, 2007 (KR) .................. 10-2007-0060101

(51) Int. Cl.
*G06K 9/36* (2006.01)
*G06K 9/46* (2006.01)

(52) U.S. Cl.
USPC .......................................... 382/233; 382/238

(58) Field of Classification Search
USPC .................. 382/233, 173, 236, 238
See application file for complete search history.

(56) References Cited

U.S. PATENT DOCUMENTS

| 6,055,012 | A | 4/2000 | Haskell et al. |
| 6,754,270 | B1 * | 6/2004 | Golin et al. ............ 375/240.12 |
| 7,782,943 | B2 * | 8/2010 | Jeon et al. ............. 375/240.12 |
| 7,881,546 | B2 * | 2/2011 | Page et al. .................. 382/234 |
| 2006/0132610 | A1 | 6/2006 | Xin et al. |
| 2007/0104276 | A1 | 5/2007 | Ha |
| 2008/0089405 | A1 * | 4/2008 | Cho et al. ............. 375/240.01 |

FOREIGN PATENT DOCUMENTS

| EP | 1501318 A1 | 1/2005 |
| KR | 10-2006-0065553 A | 6/2006 |
| KR | 10-2007-0036542 A | 4/2007 |
| WO | 2006062377 A1 | 6/2006 |

OTHER PUBLICATIONS

Communication from the European Patent Office dated Jul. 19, 2011 in counterpart European Patent Application No. 08741494.2.
"Joint Multi-view Video Model (JMVM) 4", ITU Study Group 16—Video Coding Experts Group—ISO/IEC MPEG & ITU-T VCEG (ISO/IEC JTC1/SC29/WG11 and ITU-T SG16 Q6), XX, XX, No. JVT-W207, May 18, 2007, XP030007108, 10 pages.
Gabbouj M et al: "Isolated Regions in Video Coding", IEEE Transactions on Multimedia, IEEE Service Center, Piscataway, NJ, US, vol. 6, No. 2, Apr. 1, 2004, pp. 259-267, XP011109137, ISSN: 1520-9210, DOI: 10.1109/TMM.2003.822784.
Communication issued Oct. 11, 2011 from the European Patent Office in counterpart European application No. 08741494.2.

* cited by examiner

*Primary Examiner* — Phuoc Tran
(74) *Attorney, Agent, or Firm* — Sughrue Mion, PLLC (57) ABSTRACT

A method and apparatus for encoding/decoding an image are provided. The method includes partitioning an image into a plurality of areas, allocating the partitioned plurality of areas to views of multi-view image sequences, and encoding the allocated plurality of areas. By doing so, the method can efficiently encode a large-screen image or a high-pixel image, without using a separate codec.

12 Claims, 5 Drawing Sheets

METHOD AND APPARATUS FOR ENCODING/DECODING IMAGE BY PARTITIONING IMAGE

CROSS-REFERENCE TO RELATED PATENT APPLICATION

This application claims priority from Korean Patent Application No. 10-2007-0060101, filed on Jun. 19, 2007 in the Korean Intellectual Property Office, the disclosure of which is incorporated herein in its entirety by reference.

BACKGROUND OF THE INVENTION

1. Field of the Invention

Apparatuses and methods consistent with the present invention relate to encoding/decoding an image, and more particularly, to encoding/decoding a large-screen image or a high-pixel image, without using a separate codec.

2. Description of the Related Art

In general, image data is high-capacity data and therefore the image data is highly compressed so as to be efficiently transmitted or stored. Examples of image data compression standards are Moving Picture Experts Group-1 (MPEG-1), MPEG-2, MPEG-4, and H.264/MPEG-4 Advanced Video Codec (AVC).

Image compression is performed by using the fact that a statistical characteristic of an image has spatial and temporal redundancy. Intra-prediction encoding is performed by using spatial redundancy existing within one image, or inter-prediction encoding is performed by using temporal redundancy existing between sequential images. The spatial and temporal redundancy is removed by using various methods, and then encoding is performed within an optimized encoding mode, based on image distortion and a compression ratio of an image.

Since a complicated algorithm is used to increase a compression ratio; in order to encode an image or to decode an encoded image according to image data compression technology with the complicated algorithm, a high-speed processing apparatus and a high-capacity memory device are required.

In particular, as the image quality increases, the demand for the high-speed processing apparatus and the high-capacity memory device also increases.

SUMMARY OF THE INVENTION

Exemplary embodiments of the present invention provide a method and an apparatus for encoding/decoding a large-screen image or a high-pixel image.

According to an aspect of the present invention, there is also provided a computer readable recording medium having recorded thereon a program for executing the method.

According to an aspect of the present invention, there is provided a method of encoding an image, the method including the operations of partitioning the image into a plurality of areas; respectively allocating the plurality of areas to views of multi-view image sequences; and encoding the plurality of areas by using a method of encoding the multi-view image sequences, based on an allocation result.

The operation of encoding the plurality of areas may include predicting the plurality of areas by using at least one of intra-prediction, inter-area prediction, and temporal prediction, according to the method of encoding the multi-view image sequences; and encoding the plurality of areas, based on a result of prediction.

The operation of encoding the plurality of areas may further include encoding information indicating that the image is partitioned into the plurality of areas, and the plurality of areas are encoded by using the method of encoding the multi-view image sequences.

According to another aspect of the present invention, there is provided an image encoding apparatus including a partition unit partitioning an image into a plurality of areas, and respectively allocating the plurality of areas to views of multi-view image sequences; a prediction unit predicting the plurality of areas by using at least one of intra-prediction, inter-area prediction, and temporal prediction, according to a method of encoding the multi-view image sequences; and an encoding unit encoding the plurality of areas, based on a result of the prediction.

The encoding unit may encode information indicating that the image is partitioned into the plurality of areas, and the plurality of areas are encoded by using the method of encoding the multi-view image sequences.

According to another aspect of the present invention, there is provided a method of decoding an image, the method including the operations of receiving data of the image, wherein the image is partitioned into a plurality of areas and the plurality of areas are encoded by using a method of encoding multi-view image sequences; decoding the received data; restoring the plurality of areas, based on the decoded data; and restoring the image by using the restored plurality of areas.

The operation of restoring the plurality of areas may include predicting the plurality of areas by using at least one of intra-prediction, inter-area prediction, and temporal prediction; and restoring the plurality of areas by using a result of the prediction and the decoded data.

According to another aspect of the present invention, there is provided an image decoding apparatus including a decoding unit receiving data of an image, wherein the image is partitioned into a plurality of areas and the plurality of areas are encoded by using a method of encoding multi-view image sequences, and decoding the received data; a prediction unit predicting the plurality of areas by using at least one of intra-prediction, inter-area prediction, and temporal prediction; and an image restoration unit restoring the plurality of areas and the image by using a result of the prediction and the decoded data.

The data of the image may include information indicating that the image is partitioned into the plurality of areas, and the plurality of areas are encoded by using the method of encoding the multi-view image sequences.

According to another aspect of the present invention, there is provided a computer readable recording medium having recorded thereon a program for executing the method of encoding/decoding an image.

BRIEF DESCRIPTION OF THE DRAWINGS

The above and other aspect of the present invention will become more apparent from the following detailed description of exemplary embodiments thereof with reference to the attached drawings in which.

DETAILED DESCRIPTION OF EXEMPLARY EMBODIMENTS OF THE PRESENT INVENTION

Various aspects of the present invention will now be described more fully with reference to the accompanying drawings, in which exemplary embodiments of the invention are shown.

Figure 1:
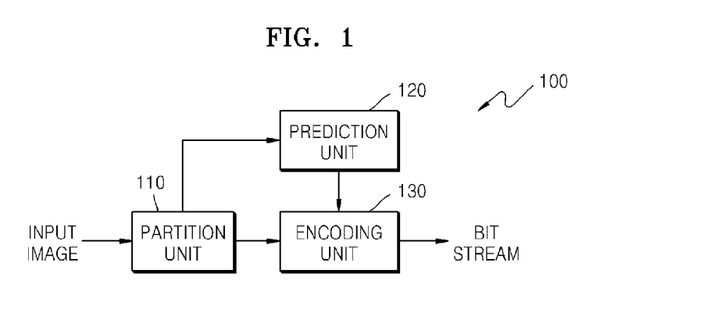
FIG. 1 is a block diagram illustrating an image encoding apparatus according to an exemplary embodiment of the present invention.

FIG. 1 is a block diagram illustrating an image encoding apparatus 100 according to an embodiment of the present invention.

Referring to FIG. 1, the image encoding apparatus 100 according to the present invention includes a partition unit 110, a prediction unit 120, and an encoding unit 130.

Figure 2:
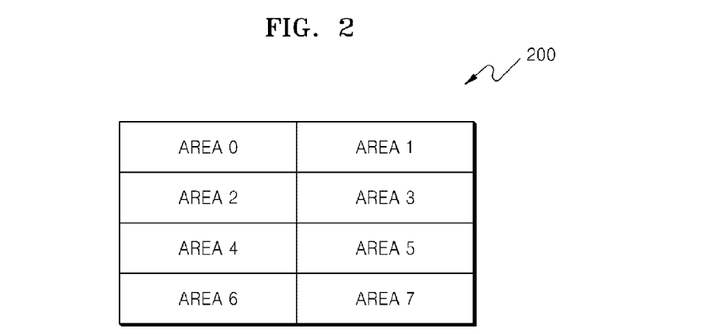
FIG. 2 is a diagram illustrating partitioning of an image according to an exemplary embodiment of the present invention.

The partition unit 110 partitions an image into a plurality of areas. As mentioned above in relation to the related art, a high-speed processing apparatus and a high-capacity memory device are required so as to process a large-screen image or a high-pixel image in real-time. Hence, the image encoding apparatus 100 according to an exemplary embodiment of the present invention partitions an input image into a plurality of areas, and encodes the plurality of areas by using a method used for encoding multi-view image sequences. For this purpose, the partition unit 110 partitions the input image into the plurality of areas. The methods used to partition images are not limited to any one method. However, an input image 200 may be partitioned into rectangular shaped areas of uniform size as illustrated in FIG. 2.

After partitioning the input image, the partition unit 110 allocates the plurality of areas generated by partitioning the input image to different views of multi-view image sequences. As mentioned above, in order to encode an image by using the method of encoding multi-view image sequences, the partition unit 110 allocates the plurality of areas generated by partitioning the input image to the views of multi-view image sequences. This will be described in greater detail with reference to FIGS. 3A and 3B.

Figure 3A:
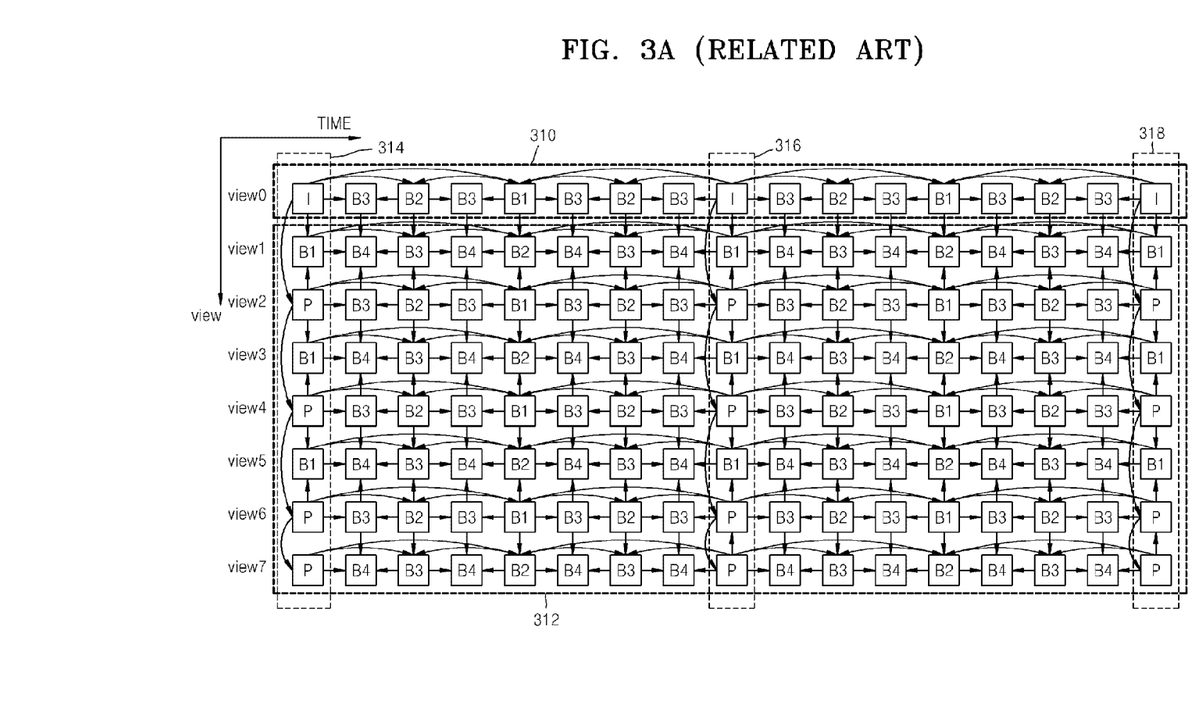
FIG. 3A is a diagram illustrating multi-view image sequences according to the related art.

FIG. 3A is a diagram illustrating multi-view image sequences according to the related art.

A method of encoding a multi-view image includes simultaneously encoding images that have been input from a plurality of cameras, thus providing a multi-view image. The method encodes and efficiently compresses the multi-view image by using temporal correlation, and spatial correlation between the plurality of cameras.

In FIG. 3A, the horizontal axis indicates the time axis, and the vertical axis indicates the view axis. The method of encoding the multi-view image periodically generates an I picture (intra picture) of a base view image. On the basis of the generated I picture, the method predictably encodes other pictures, by performing temporal prediction or inter-view prediction.

The temporal prediction uses temporal correlation existing between pictures in the same horizontal line, i.e., the same view, and the inter-view prediction uses spatial correlation existing between pictures in the same vertical line, i.e., the same time.

The respective horizontal lines illustrated in FIG. 3A illustrate image sequences of respective views of multi-view images, according to time. The respective horizontal lines are, sequentially from the top, the image sequences of view 0, view 1, view 2, through to view 7. Here, the view 0 is a base view and thus, an image sequence 310 of the first horizontal line is an image sequence of the base view. Pictures included in the image sequence of the base view are predictably encoded by performing temporal prediction.

Also, respective vertical lines illustrate same-time multi-view images. The anchor pictures included in the vertical lines 314, 316, and 318 include I-pictures and are encoded based on inter-view prediction.

Figure 3B:
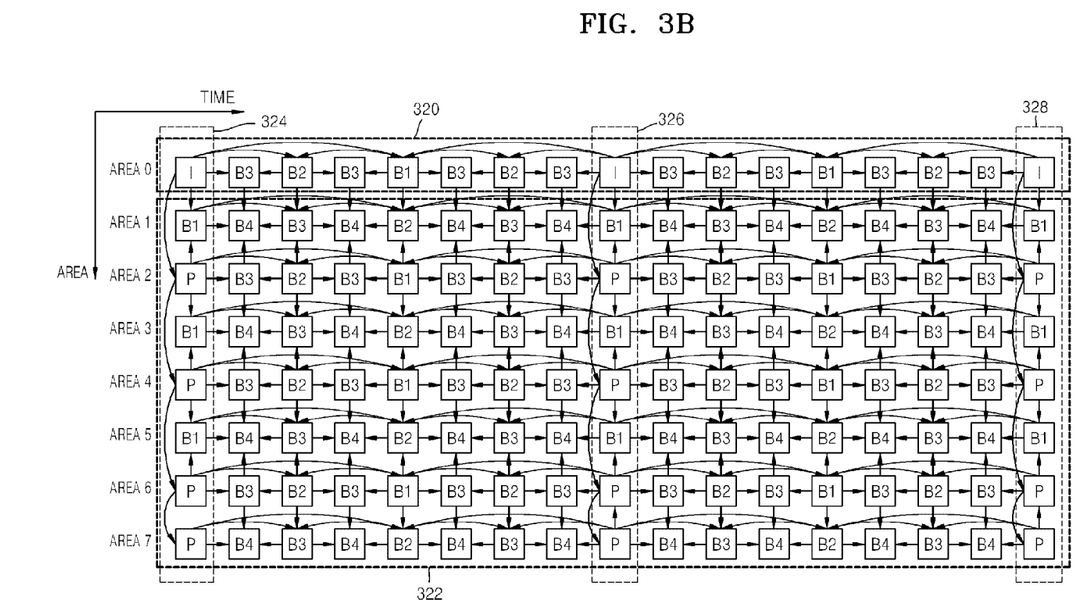
FIG. 3B is a diagram illustrating image sequences according to an exemplary embodiment of the present invention.

FIG. 3B is a diagram illustrating image sequences according to an exemplary embodiment of the present invention.

FIG. 3B illustrates a case where an image of one view is partitioned into a plurality of areas 0 through 7 as illustrated in FIG. 2, and the image is encoded by using a method of encoding multi-view image.

Referring to FIG. 3B, the plurality of areas illustrated in FIG. 2 are allocated to the respective views illustrated in FIG. 3A. The area 0 is allocated to the image sequence of the view 0, the area 1 is allocated to the image sequence of the view 1, etc. In this manner, all of the plurality of areas illustrated in FIG. 2 are allocated to their respective views.

As a result of the allocation, the image sequence 310 of the view 0 becomes an image sequence 320 of the area 0, illustrating pictures of the area 0, according to time. Likewise, other image sequences 322 illustrate pictures included in each of the areas, according to time.

Referring back to FIG. 1, the prediction unit 120 predicts the plurality of areas partitioned by the partition unit 110, according to the method of encoding the multi-view image sequences. This will now be described in detail with reference to FIG. 3B.

The method of encoding the multi-view image sequences described in relation to FIG. 3A predicts the respective pictures included in the image sequence, by using inter-view prediction or temporal prediction. Also, the anchor picture of the base view is predicted by using intra-prediction.

Therefore, the pictures included in the image sequences illustrated in FIG. 3B are predicted by using at least one of intra-prediction, inter-area prediction, and temporal prediction, wherein the plurality of areas are allocated to the image sequences by the partition unit 110.

Anchor pictures included in the image sequence of the area 0 illustrated in FIG. 3B, i.e., pictures corresponding to a position of I pictures in the first horizontal line, are predicted by using intra-prediction.

Temporal prediction is performed by using a temporal correlation between pictures existing in the same horizontal row, wherein the same horizontal row corresponds to the same area. However, in the image sequences according to exemplary embodiments of the present invention, the inter-view prediction mentioned above in relation to FIG. 3A is changed to inter-area prediction.

The respective horizontal lines are the image sequences of the different areas, but not the different views. Thus, in the image sequences according to the exemplary embodiments of the present invention, prediction among pictures in real-time, i.e., prediction among pictures in the same vertical columns, is based on prediction among the areas.

The first vertical column 324 of the image sequences illustrated in FIG. 3B is described as an example.

Referring to FIG. 3B, the picture of the area 2 in the first vertical column 324 is predicted, by referring to the picture of the area 0 in the same column 324. The picture of the area 4 in column 324 is predicted, by referring to the picture of the area 2 in column 324. It should be noted that bidirectional prediction is also possible. For example, the picture of the area 1 is predicted by referring to the pictures of the areas 0 and 2. The inter-view prediction described in relation to FIG. 3A is changed to inter-area prediction.

Referring back to FIG. 2, based on the result of prediction by the prediction unit 120, the encoding unit 130 encodes the plurality of areas partitioned by the partition unit 110. The encoding unit 130 generates residual values by reducing prediction values of the respective areas from original values, and encodes the generated residual values, wherein the prediction values are generated by the prediction unit 120.

The method of encoding the image according to an exemplary embodiment of the present invention includes generating an image sequences of an image of one view, by using the method of encoding multi-view image sequences. Thus, information is required for discriminating between multi-view image sequences and image sequences illustrated in FIG. 3B. For this purpose, the encoding unit 130 encodes information indicating that the partitioned plurality of areas are encoded by using the method of encoding the multi-view image sequences.

The encoding unit 130 may encode flag information indicating whether the image sequences are the multi-view image sequences or the image sequences illustrated in FIG. 3B. The flag information may be encoded by using a method of including the flag information in a parameter of the image sequences.

FIGS. 1 through 3B illustrate a case in which the input image is a moving picture. However, the image encoding apparatus 100 according to an exemplary embodiment of the present invention may also encode a still image, by using the same method. For example, the still image may be encoded by using only the first vertical line 324 from among the image sequences illustrated in FIG. 3B. In such a case, the still image is partitioned into a plurality of areas, the partitioned plurality of areas are respectively allocated to the pictures of the first vertical line 324, and then the plurality of areas are encoded by using intra-prediction or inter-area prediction.

Figure 4:
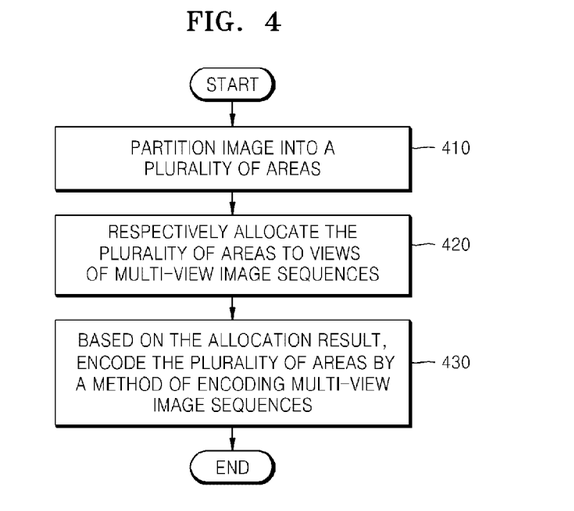
FIG. 4 is a flowchart illustrating a method of encoding an image according to an exemplary embodiment of the present invention.

FIG. 4 is a flowchart illustrating a method of encoding an image according to an exemplary embodiment of the present invention.

In operation 410, an image encoding apparatus 100 partitions an input image into a plurality of areas. As illustrated in FIG. 2, the input image corresponding to a view, is partitioned into rectangular shaped areas of uniform size so that a plurality of areas are generated.

In operation 420, the image encoding apparatus 100 respectively allocates the plurality of areas generated in operation 410 to views of multi-view image sequences. In order to encode the plurality of areas by using a method of encoding multi-view image sequences, the plurality of areas are respectively allocated to the respective views. As a result of the allocation, respective image sequences of the respective views become respective image sequences of the respective areas.

In operation 430, the image encoding apparatus 100 encodes the plurality of areas, on the basis of the allocation in operation 420. The plurality of areas are then encoded by using the method of encoding the multi-view image sequences.

Pictures included in the image sequence are predicted by using at least one of intra-prediction, inter-area prediction, or temporal prediction. On the basis of a prediction result, the plurality of areas are encoded.

In the encoding operation, information indicating that an image is partitioned into a plurality of areas (operation 410) and that the plurality of areas are encoded by using a method of encoding multi-view image sequences (operation 420) is encoded along with the plurality of areas. The flag information is included in a parameter of the image sequences.

Figure 5:
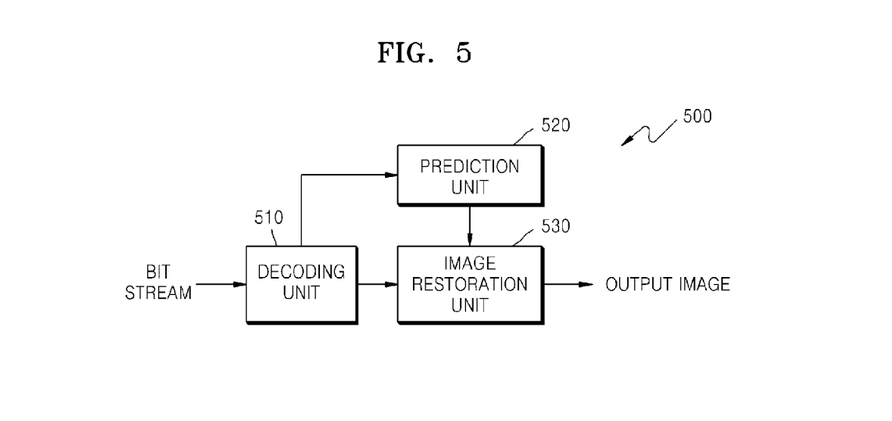
FIG. 5 is an image decoding apparatus according to an exemplary embodiment of the present invention.

FIG. 5 illustrates an image decoding apparatus 500 according to an embodiment of the present invention.

Referring to FIG. 5, the image decoding apparatus 500 according to an exemplary embodiment of the present invention includes a decoding unit 510, a prediction unit 520, and an image restoration unit 530.

The decoding unit 510 receives data of an image encoded by using a method of encoding an image according to an exemplary embodiment of the present invention, and decodes the received data. The received data is data generated by partitioning an input image into a plurality of areas and then encoding the plurality of areas by using a method of encoding multi-view image sequences. The received data includes information indicating that the input image is encoded by the method of encoding the image according to an exemplary embodiment of the present invention. The information may be flag information included in a parameter of the image sequences.

The prediction unit 520 predicts the plurality of areas decoded by the decoding unit 510, by using at least one of intra-prediction, inter-area prediction, and temporal prediction. Similar to a prediction unit used in an encoding process, the prediction unit 520 predicts the plurality of areas by using a method of decoding multi-view image sequences. However, inter-view prediction for multi-view image sequences according to the related art is changed to inter-area prediction for image sequences.

The image sequences decoded by the decoding unit 510 are sequences of the plurality of areas, rather than not sequences of a plurality of views. Thus, the inter-view prediction for the image sequences of the multi-view image is changed to the inter-area prediction for the image sequences according to an exemplary embodiment of the present invention.

The image restoration unit 530 restores the plurality of areas, by using the result of prediction by the prediction unit 520 and the decoded data from the decoding unit 510. The plurality of areas are restored by adding prediction values of the plurality of areas to residual values decoded by the decoding unit 510, wherein the prediction is performed by the prediction unit 520.

When all of the plurality of areas are restored, an output image is restored. By disposing the restored plurality of areas for respective positions as illustrated in FIG. 2, the encoded image is restored, and an output image is generated.

Similar to that described above in relation to an image encoding apparatus 100, the output image may be a still image. In such a case, the still image is restored by performing a decoding method that corresponds to a method of encoding a still image.

Figure 6:
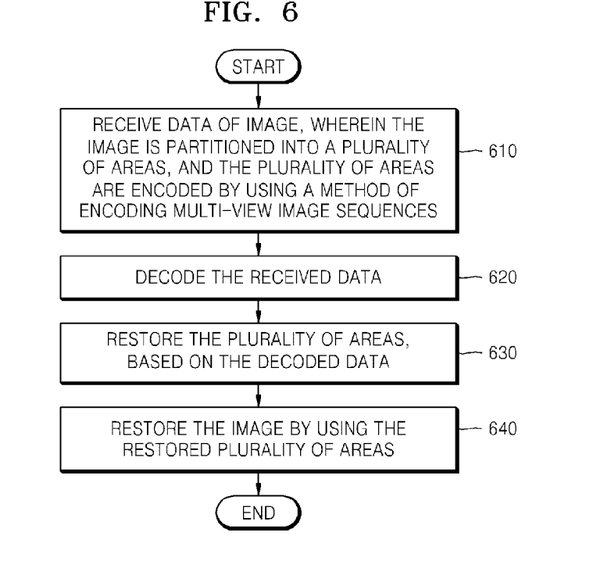
FIG. 6 is a flowchart illustrating a method of decoding an image according to an exemplary embodiment of the present invention.

FIG. 6 is a flowchart illustrating a method of decoding an image according to an exemplary embodiment of the present invention.

Referring to FIG. 6, in operation 610, the image decoding apparatus 500 receives data of an image encoded by a method of encoding an image according to an exemplary embodiment of the present invention. The received data is data generated by partitioning an input image into a plurality of areas and then encoding the plurality of areas by using a method of encoding multi-view image sequences. The received data includes information indicating that the input image is encoded by the method of encoding the image according to an exemplary embodiment of the present invention.

In operation 620, the image decoding apparatus 500 decodes the data received in operation 610. As a result of the decoding, residual values of the plurality of areas are generated.

In operation 630, the image decoding apparatus 500 restores the plurality of areas, based on the data decoded in operation 620. The plurality of areas are predicted by performing at least one of intra-prediction, inter-area prediction, and temporal prediction. As a result of prediction, prediction values of the plurality of areas are generated, and the prediction values are added to the residual values generated by decoding in operation 620, thereby restoring the plurality of areas.

In operation 640, the image decoding apparatus 500 restores the image, based on the plurality of areas restored in operation 630. By disposing the plurality of areas restored in operation 630 as illustrated in FIG. 2, the encoded image is restored.

Figure 7:
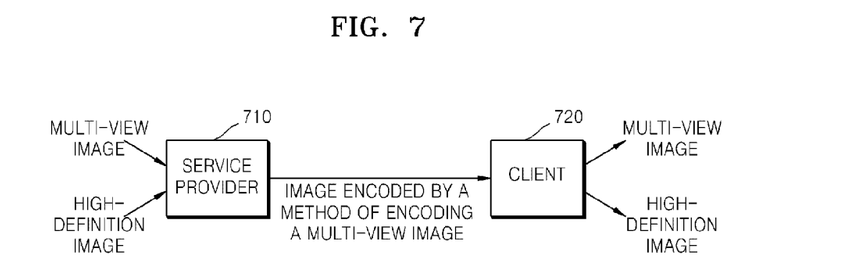
FIG. 7 is a block diagram illustrating a system for encoding/decoding an image according to an exemplary embodiment of the present invention.

FIG. 7 is a block diagram illustrating a system for encoding/decoding an image according to an exemplary implementation of the present invention.

In the system illustrated in FIG. 7, a service provider 710 provides an encoded image to a client 720, and the client 720 reproduces the encoded image via a display apparatus, by decoding the encoded image.

Referring to FIG. 7, the service provider 710 encodes a multi-view image, a large-screen image or a high-pixel image, by using a method of encoding multi-view image sequences. If an image to be encoded is the multi-view image, pictures included in an image sequence are predicted by using at least one of intra-prediction, inter-view prediction, and temporal prediction, and the pictures are encoded based on the result of prediction. However, if an image to be encoded is an image of one view, pictures included in an image sequence are predicted by using at least one of intra-prediction, inter-area prediction, and temporal prediction, and the pictures are encoded based on the result of prediction, wherein the image to be encoded may be the large-screen image or the high-pixel image.

Flag information indicating whether the image sequences are for the multi-view image or for the one-view image is included in a parameter of the image sequences and encoded.

The multi-view image, the large-screen image or the high-pixel image are encoded by the method of encoding the multi-view image sequences, and then transferred to the client 720. The client 720 determines whether the image sequences are for the multi-view image or for the one-view image, by referring to the flag information of the parameter of the image sequences, and then restores the multi-view image, the large-screen image or the high-pixel image.

Although the client 720 only has a codec for a method of decoding multi-view image sequences, the client 720 may decode all of the multi-view image, the large-screen image or the high-pixel image. A processing apparatus and a memory device used to process a multi-view image may be used as they are, so that the large-screen image or the high-pixel image may be decoded in real-time.

According to the exemplary embodiments, the large-screen image or the high-pixel image may be more efficiently encoded, by using the method of encoding the multi-view image sequences. The same codec for encoding/decoding of multi-view image sequences may be used for encoding/decoding an image. Therefore, it is not necessary to pay additional royalties for using a separate codec.

Also, the processing apparatus and the memory device used to encode/decode the multi-view image may be used for processing the large-screen image or the high-pixel image in real-time. Therefore, in order to reproduce the large-screen image or the high-pixel image in real-time, a separate high-speed processing apparatus and high-capacity memory device are not required.

The invention can also be embodied as a computer readable program stored on a computer readable recording medium. The computer readable recording medium may be any data storage device that can store data which can be thereafter be read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable program is stored and executed in a distributed fashion.

While the present invention has been particularly shown and described with reference to exemplary embodiments thereof, it will be understood by those of ordinary skill in the art that various changes in form and details may be made therein without departing from the spirit and scope of the invention as defined by the appended claims.

What is claimed is:

1. A method of decoding an image, the method comprising:
receiving data of the image captured by a single camera, wherein the image has been partitioned into a plurality of areas, each of the plurality of areas is allocated to a respective view of a corresponding multi-view image sequence comprising temporal images of a same area, and the plurality of areas have been encoded by using a method of encoding multi-view image sequences;
decoding the received data;
restoring the plurality of areas, based on the decoded data; and
restoring the image based on the restored plurality of areas,
wherein the receiving comprises receiving the data of sequential images, each of which has been partitioned into the plurality of areas, and the same area partitioned in each sequential image is allocated to the respective view of the corresponding multi-view image sequence.

2. The method of claim 1, wherein the restoring the plurality of areas comprises:
predicting the plurality of areas by using at least one of intra-prediction, inter-area prediction, and temporal prediction; and
restoring the plurality of areas based on a result of the predicting the plurality of areas and the decoded data.

3. The method of claim 1, wherein the data of the image includes information indicating that the image has been partitioned into the plurality of areas, and the plurality of areas have been encoded by using the method of encoding the multi-view image sequences.

4. The method of claim 3, wherein the information is flag information indicating that the image has been partitioned into the plurality of areas, and the plurality of areas have been encoded by using the method of encoding the multi-view image sequences.

5. The method of claim 1, wherein the image is a still image.

6. The method of claim 1, wherein each of the plurality of areas, into which the image has been partitioned, is of equal size.

7. The method of claim 1, wherein temporal sequences of same areas partitioned in each of the sequential images are formed instead of the multi-view image sequences representing sequences of a same image captured at different times, and spatial sequences of different areas of a same image of the sequential images are formed instead of the multi-view image sequences representing different images captured at the same time.

8. An image decoding apparatus comprising:

a decoding unit which receives data of an image captured by a single camera, wherein the image has been partitioned into a plurality of areas, each of the plurality of areas is allocated to a respective view of a corresponding multi-view image sequence comprising temporal images of a same area, and the plurality of areas have been encoded by using a method of encoding multi-view image sequences, and decoding the received data;

a prediction unit which predicts the plurality of areas by using at least one of intra-prediction, inter-area prediction, and temporal prediction; and an image restoration unit which restores the plurality of areas and the image based on a result of the prediction by the prediction unit and the decoded data, wherein the decoding unit receives the data of sequential images, each of which has been partitioned into the plurality of areas, and the same area partitioned in each sequential image is allocated to the respective view of the corresponding multi-view image sequence.

9. The image decoding apparatus of claim 8, wherein the data of the image includes information indicating that the image has been partitioned into the plurality of areas, and the plurality of areas have been encoded by using the method of encoding the multi-view image sequences.

10. The image decoding apparatus of claim 9, wherein the information is flag information indicating that the image has been partitioned into the plurality of areas, and the plurality of areas have been encoded by using the method of encoding the multi-view image sequences.

11. The image decoding apparatus of claim 8, wherein the image is a still image.

12. A non-transitory computer readable recording medium having recorded thereon a program which, when executed by a computer, causes the computer to execute a method of decoding an image, the method comprising:

receiving data of the image captured by a single camera, wherein the image has been partitioned into a plurality of areas, each of the plurality of areas is allocated to a respective view of a corresponding multi-view image sequence comprising temporal images of a same area, and the plurality of areas have been encoded by using a method of encoding multi-view image sequences;

decoding the received data;

restoring the plurality of areas, based on the decoded data; and restoring the image based on the restored plurality of areas, wherein the receiving comprises receiving the data of sequential images, each of which has been partitioned into the plurality of areas, and the same area partitioned in each sequential image is allocated to the respective view of the corresponding multi-view image sequence.

* * * * *